(12) United States Patent
Kosnik et al.

(10) Patent No.: US 9,720,660 B2
(45) Date of Patent: Aug. 1, 2017

(54) BINARY INTERFACE INSTRUMENTATION

(71) Applicant: Red Hat, Inc., Raleigh, NC (US)

(72) Inventors: Benjamin De Kosnik, San Francisco, CA (US); Jason Merrill, Somerville, MA (US); Dodji Seketeli, Deuil-la-Barre (FR)

(73) Assignee: Red Hat, Inc., Raleigh, NC (US)

( * ) Notice: Subject to any disclaimer, the term of this patent is extended or adjusted under 35 U.S.C. 154(b) by 154 days.

(21) Appl. No.: 13/899,519

(22) Filed: May 21, 2013

(65) Prior Publication Data

US 2014/0351799 A1   Nov. 27, 2014

(51) Int. Cl.
*G06F 9/45* (2006.01)
*G06F 9/44* (2006.01)
*G06F 9/445* (2006.01)

(52) U.S. Cl.
CPC .............. *G06F 8/41* (2013.01); *G06F 8/24* (2013.01); *G06F 8/60* (2013.01)

(58) Field of Classification Search
CPC ............... G06F 8/41; G06F 8/44; G06F 8/54
See application file for complete search history.

(56) References Cited

U.S. PATENT DOCUMENTS

| | | | | |
|---|---|---|---|---|
| 7,650,600 | B2 * | 1/2010 | King et al. ................ | 717/148 |
| 2003/0093551 | A1 * | 5/2003 | Taylor ................. | G06F 8/36 709/237 |
| 2004/0111720 | A1 * | 6/2004 | Vertes ..................... | 717/164 |
| 2004/0226030 | A1 * | 11/2004 | Marvin .................... | G06F 8/41 719/328 |
| 2005/0055682 | A1 * | 3/2005 | Gadre ..................... | G06F 8/41 717/146 |
| 2005/0066306 | A1 * | 3/2005 | Diab ....................... | G06F 8/24 717/108 |
| 2006/0288353 | A1 * | 12/2006 | King et al. ................ | 719/331 |
| 2008/0072219 | A1 * | 3/2008 | Kabadiyski .............. | G06F 8/60 717/175 |
| 2009/0063108 | A1 * | 3/2009 | De Atley et al. ............. | 703/2 |
| 2009/0113402 | A1 * | 4/2009 | Chen ....................... | G06F 8/41 717/140 |
| 2009/0144703 | A1 * | 6/2009 | Vairavan et al. ............ | 717/122 |
| 2010/0077387 | A1 * | 3/2010 | Callaghan et al. .......... | 717/140 |
| 2011/0185346 | A1 * | 7/2011 | Andrade .................. | G06F 8/60 717/151 |
| 2012/0222022 | A1 * | 8/2012 | Barcia et al. ............... | 717/148 |

(Continued)

OTHER PUBLICATIONS

Callahan et al., "A packaging system for heterogeneous execution environments," 1991, IEEE Transactions on Software Engineering, vol. 17, Issue 6, pp. 626-635, [retrieved on Mar. 23, 2017], Retrieved from the Internet:<URL:http://ieeexplore.ieee.org/>.*

(Continued)

*Primary Examiner* — Geoffrey St Leger
*Assistant Examiner* — Stephen Berman
(74) *Attorney, Agent, or Firm* — Lowenstein Sandler LLP

(57) ABSTRACT

A system and methods for generating metadata based on source code are disclosed. In accordance with one embodiment, a computer system receives a command to compile source code, and in response to the command, generates an executable and a metadata file based on the source code, where the metadata file comprises information pertaining to at least one of a scalar type of the source code, a variable of the source code, or a function of the source code.

17 Claims, 9 Drawing Sheets

(56) References Cited

U.S. PATENT DOCUMENTS

| | | | |
|---|---|---|---|
| 2014/0189641 A1* | 7/2014 | Anderson | G06F 8/60 |
| | | | 717/110 |
| 2014/0282391 A1* | 9/2014 | Doughan | G06F 9/4428 |
| | | | 717/116 |
| 2014/0282395 A1* | 9/2014 | Wang | G06F 8/71 |
| | | | 717/120 |
| 2017/0031662 A1* | 2/2017 | Bezalel | G06F 8/41 |

OTHER PUBLICATIONS

Dearle, "Software Deployment, Past, Present and Future," 2007, Proceeding FOSE '07 2007 Future of Software Engineering, pp. 269-284, [retrieved on Mar. 23, 2017], Retrieved from the Internet:<URL:http://ieeexplore.ieee.org/>.*

Perry, "Version control in the Inscape environment," 1989, Proceedings of the 9th international conference on Software Engineering, pp. 142-149, [retrieved on Mar. 23, 2017], Retrieved from the Internet:<URL:http://dl.acm.org/>.*

* cited by examiner

BINARY INTERFACE INSTRUMENTATION

TECHNICAL FIELD

This disclosure relates to computer systems, and more particularly, to compilation of source code.

BACKGROUND

A compiler is a computer program, or set of programs, that transforms source code written in a programming language (the source language) into another computer language (the target language, often having a binary form known as object code). Typically a compiler performs a variety of functions including lexical analysis, preprocessing, parsing, semantic analysis (e.g., syntax-directed translation), code generation, and code optimization.

The most common use of a compiler is to create an executable program from source code. In such instances, a compiler is often used in conjunction with a computer program called a linker that takes one or more object files generated by the compiler and combines them into a single executable program.

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Described herein is a system and methods for generating metadata based on source code and checking whether binary objects generated from different source code are compatible based on the metadata. Compatibility between binary objects may depend on a variety of factors, such as the underlying operating system, the version and configuration of language and system support libraries, the version and configuration of the compiler used to generate the binary objects, post-compiler optimizations, underlying machine characteristics, and so forth.

In accordance with one embodiment, a computer system receives a command to compile source code, and in response to the command, generates one or more object files containing binary objects and a first metadata file based on the source code. The computer system then generates an executable and a second metadata file from the object files, and a third metadata file from the first metadata file and the second metadata file. The computer system may then compare the third metadata file to a baseline metadata file that is generated from some other source code, and, based on the comparison, determine whether the binary objects generated from the two source codes are compatible.

In one example, one or more of the metadata files may contain information pertaining to one or more scalar types of the source code, information pertaining to one or more variables of the source code, information pertaining to one or more functions of the source code, information pertaining to one or more class types of the source code when the source code is in an object-oriented programming language (e.g., C++, Java, etc.), information pertaining to one or more class templates of the source code when the source code is in an object-oriented programming language that supports class templates (e.g., C++, etc.), and information pertaining to one or more function templates of the source code when the source code is in a programming language supporting such constructs.

Embodiments of the present disclosure thus provide a mechanism for generating metadata based on source code, and for using the metadata to determine whether binary objects generated from different source codes are compatible. The latter capability is particularly advantageous in system integration, as it enables different executables to be checked for compatibility before they are deployed and run in a common environment. Without such a mechanism, executable incompatibilities are typically not discovered until the occurrence of failures at runtime, at which point locating and identifying the cause of the runtime failures can be difficult and costly.

Figure 1:
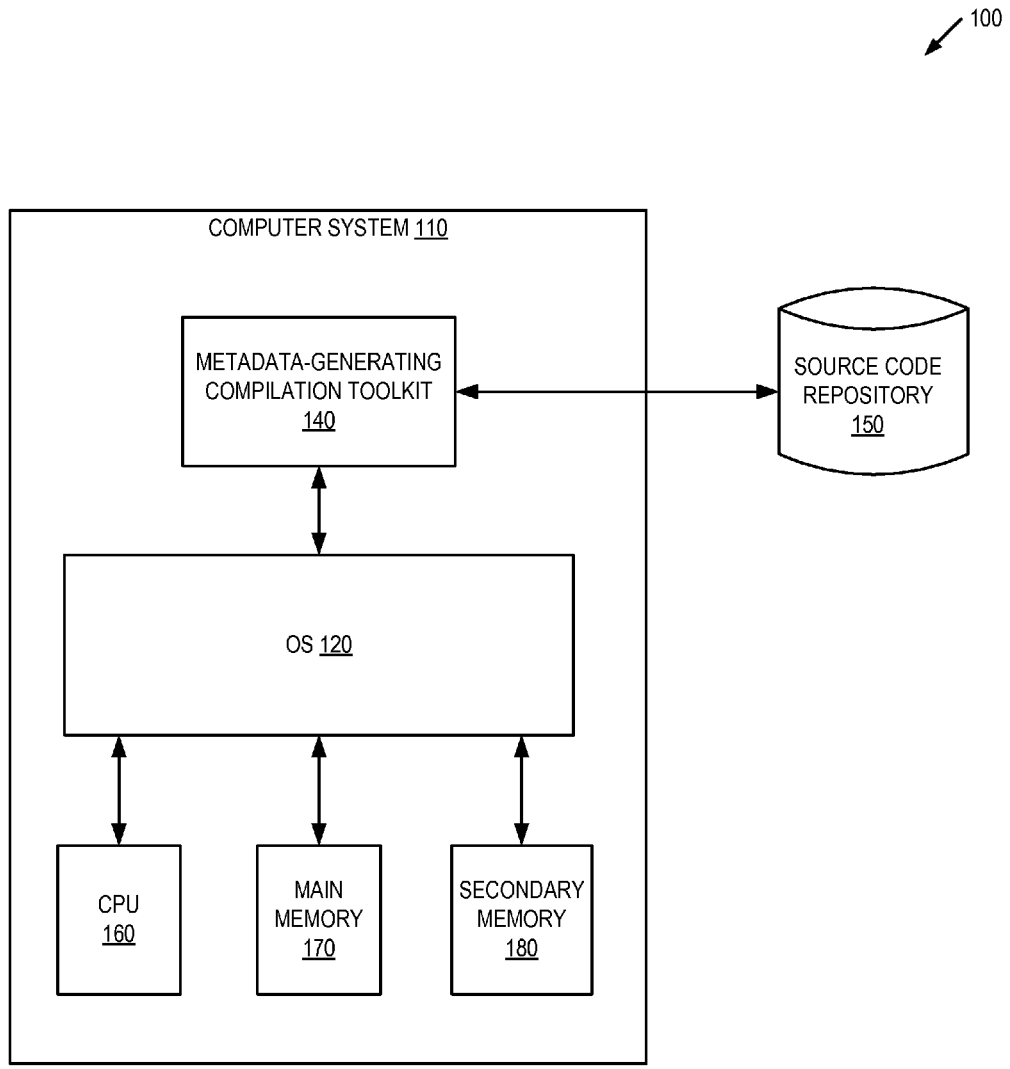
FIG. 1 depicts an exemplary computer system architecture, in accordance with an embodiment of the present invention.

FIG. 1 depicts an illustrative architecture of a system 100, in accordance with an example of the present invention. It should be noted that other architectures for system 100 are possible, and that examples of a system utilizing the disclosure are not necessarily limited to the specific architecture depicted by FIG. 1.

As shown in FIG. 1, system 100 comprises a computer system 110 and a source code repository 150. Computer system 110 may be a server, a mainframe, a workstation, a personal computer (PC), a mobile phone, a palm-sized computing device, etc. Source code repository 150 may be a file server, a database system, etc. that stores source code (e.g., one or more files stored in the C programming language, one or more files stored in the C++ programming language, etc.) and is accessible to computer system 110 (e.g., via a network, etc.). In one embodiment, computer system 110 comprises a central processing unit (CPU) 160, a main memory 170, and a secondary memory 180. Central processing unit (CPU) 160 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. Main memory 170 may include volatile memory devices (e.g., random access memory (RAM)), non-volatile memory devices (e.g., flash memory), and/or other types of memory devices. Secondary memory 180 may include a magnetic hard disk, a Universal Serial Bus [USB] solid state drive, a Redundant Array of Independent Disks [RAID] system, a network attached storage [NAS] array, etc.

It should be noted that in some alternative embodiments, source code repository 150 may be part of computer system 110 (e.g., stored on storage device 180, etc.), rather than external to computer system 110. It should further be noted that the fact that a single CPU is depicted in FIG. 1 is merely illustrative, and that in some other examples computer system 110 may comprise a plurality of CPUs.

Computer system 110 runs an operating system (OS) 120 that manages the hardware resources of the computer system and provides functions such as interprocess communication, scheduling, virtual memory management, and so forth. In one example, computer system 110 includes a metadata-generating compilation toolkit 140 that is capable of reading from and writing to source code repository 150, of compiling source code files into object code files, of linking object code files into executables, of generating metadata and files containing metadata from source code, of generating metadata files from object code files, of combining metadata files into a single metadata file, and of comparing metadata files. Some operations of metadata-generating compilation toolkit 140 are described in detail below with respect to FIGS. 3 through 8.

Figure 2:
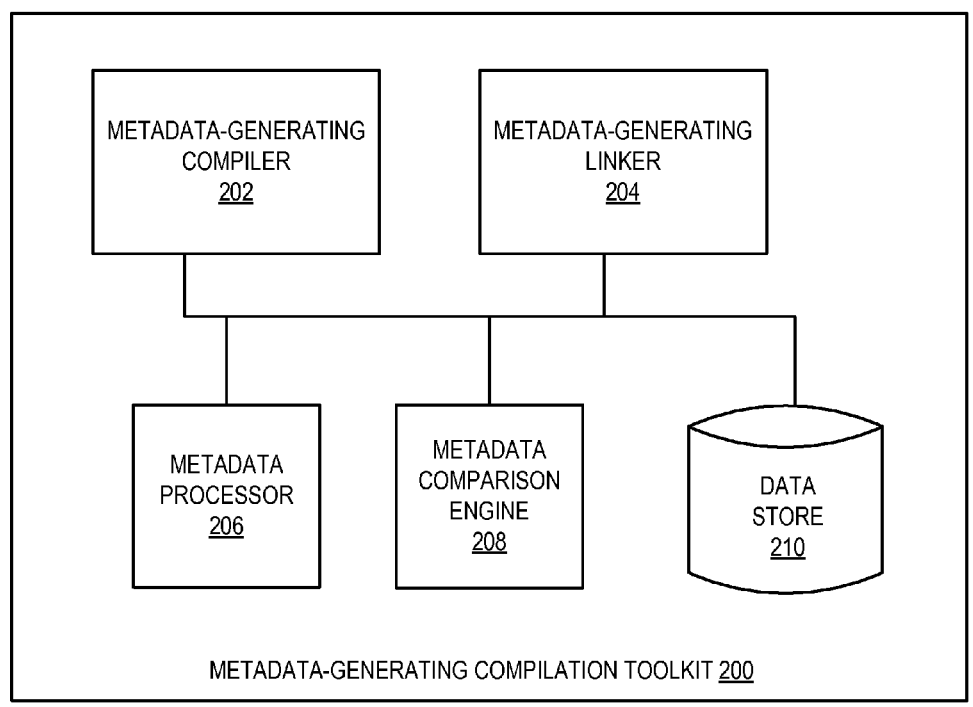
FIG. 2 depicts a block diagram of one embodiment of a metadata-generating compilation toolkit.

FIG. 2 depicts a block diagram of one embodiment of a metadata-generating compilation toolkit 200. The metadata-generating compilation toolkit 200 may be the same as the metadata-generating compilation toolkit 140 of FIG. 1 and may include a metadata-generating compiler 202, a metadata-generating linker 204, a metadata processor 206, a metadata comparison engine 208, and a data store 210.

The data store 210 may be a temporary buffer or a permanent data store to hold source code, object code, executables, metadata, or some combination of these data. Alternatively, data store 210 may be hosted by one or more storage devices, such as main memory, magnetic or optical storage based disks, tapes or hard drives, NAS, SAN, and so forth.

The metadata-generating compiler 202 compiles source code into binary objects and generates metadata and a first file containing this metadata from the source code during the compilation of the source code. In one example, the metadata is generated as eXtensible Markup Language (XML) code and the first file is a corresponding XML file. Some operations of metadata-generating compiler 202 are described in more detail below with respect to FIGS. 4 and 5.

The metadata-generating linker 204 generates an executable from one or more object files containing binary objects, and during this linking process also generates metadata and a second file containing this metadata from the object files. In one example, the metadata is generated as eXtensible Markup Language (XML) code and the second file is a corresponding XML file. Some operations of metadata-generating linker 204 are described in more detail below with respect to FIG. 6.

The metadata processor 206 processes the first and second metadata files and generates a third metadata file from the two metadata files. In one example, the third metadata file is an XML file. Some operations of metadata processor 206 are described in more detail below with respect to FIG. 7.

The metadata comparison engine 208 compares the third metadata file to a baseline metadata file to determine if binary objects associated with the third metadata file are compatible with binary objects associated with the baseline metadata file. In one example, the baseline metadata file and the third metadata file are XML files. Some operations of metadata comparison engine 208 are described in more detail below with respect to FIG. 8.

Figure 3:
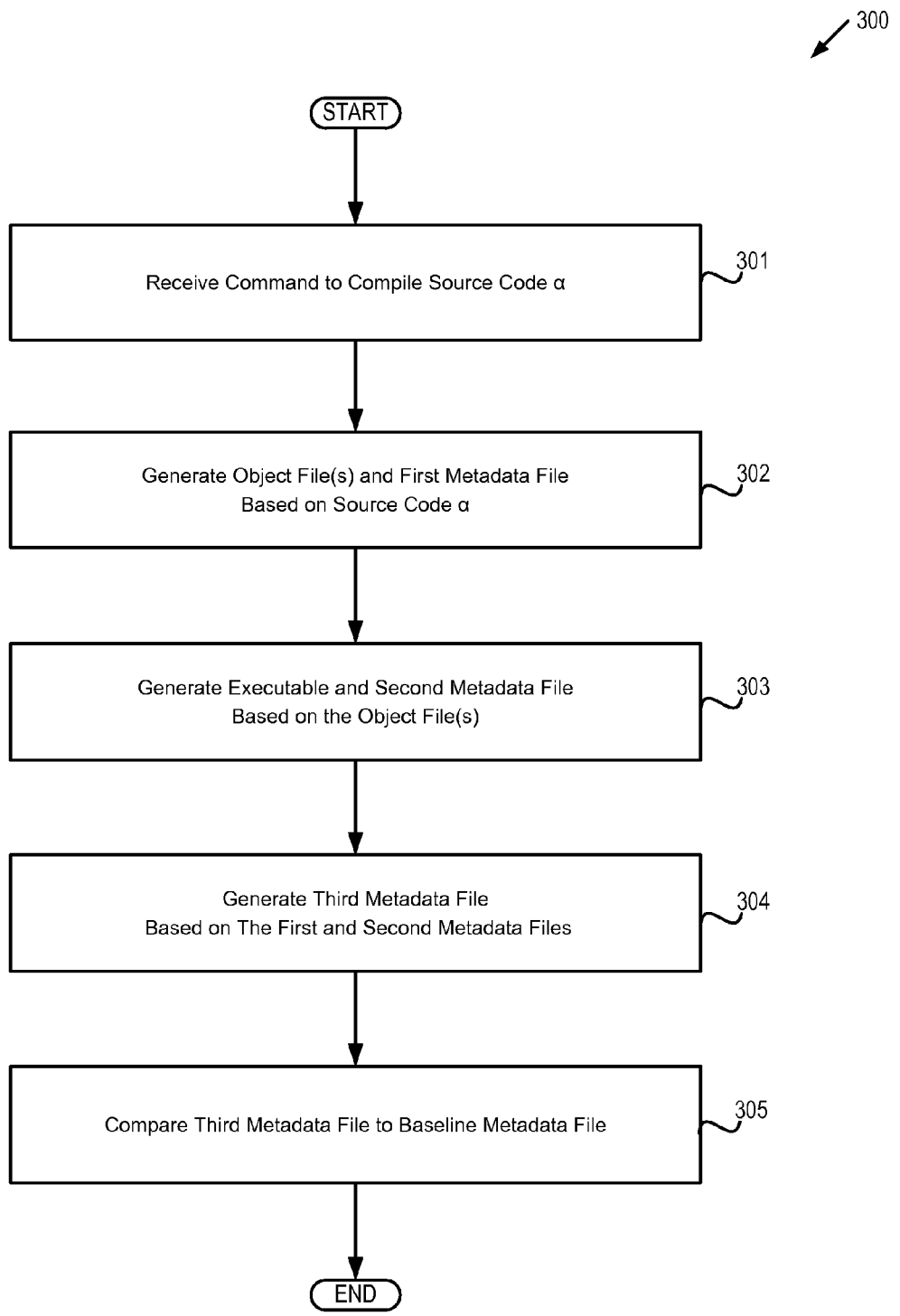
FIG. 3 depicts a flow diagram of an example of a method by which a computer system services a request to compile source code.

FIG. 3 depicts a flow diagram of an example of a method 300 by which a computer system services a request to compile source code. The method is performed by processing logic that may comprise hardware (circuitry, dedicated logic, etc.), software (such as is run on a general purpose computer system or a dedicated machine), or a combination of both. In one embodiment, the method is performed by the computer system 100 of FIG. 1, and more particularly, by the metadata-generating compilation toolkit 140, while in some other embodiments, some or all of the method might be performed by another machine. It should be noted that in some examples blocks depicted in FIG. 3 may be performed simultaneously or in a different order than that depicted.

At block 301, a command is received to compile source code cc (e.g., one or more files stored in the C programming language, one or more files stored in the C++ programming language, etc.). In one example, the compilation command includes a flag (e.g., "–fdump-xmlrepresentation", etc.) that indicates that metadata is to be generated from the source code in addition to an executable.

At block 302, one or more object files containing binary objects and a first metadata file are generated based on source code cc. A method for generating the object file(s) and the metadata file is described in detail below with respect to FIGS. 4 and 5. In one example, block 302 is performed by metadata-generating compiler 202.

At block 303, an executable and a second metadata file are generated based on the object file(s) created at block 302. A method for generating the executable and the metadata file is described in detail below with respect to FIG. 6. In one example, block 303 is performed by metadata-generating linker 204.

At block 304, a third metadata file is generated based on the two metadata files that were generated at blocks 302 and 303. A method for generating a metadata file based on two other metadata files is described in detail below with respect to FIG. 7. In one example, block 304 is performed by metadata processor 206.

At block 305, the third metadata file is compared to a baseline metadata file. In one example, the baseline metadata file is associated with binary objects that were generated from some other source code β by a prior execution of the method of FIG. 3 for source code β. In some such examples, the comparison of the third metadata file and the baseline metadata file can be used to determine whether the binary objects generated from source code α are compatible with the binary objects generated from source code β. A method for comparing the third metadata file to a baseline metadata file is described in detail below with respect to FIG. 8. In one example, block 305 is performed by metadata comparison engine 208.

Figure 4:
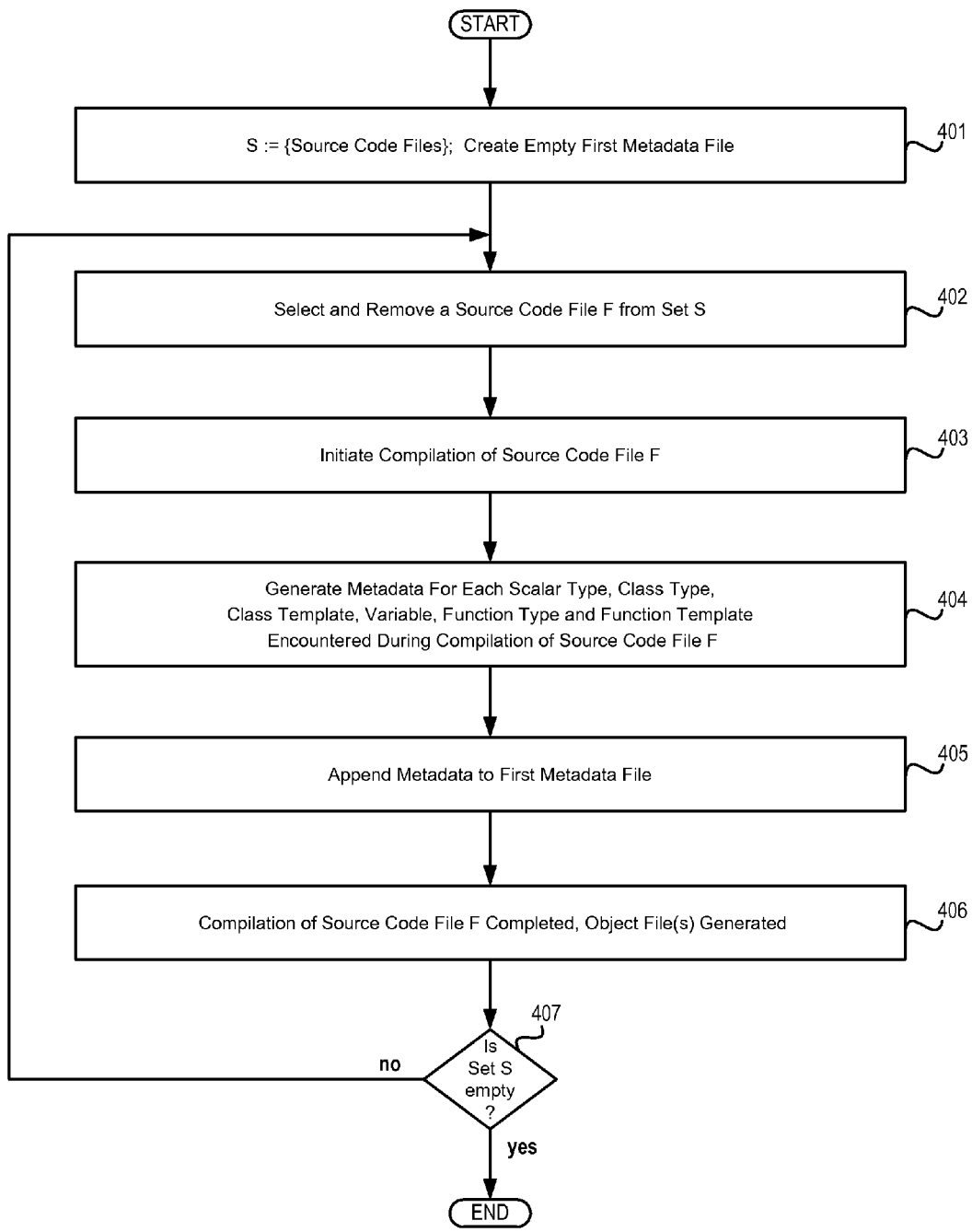
FIG. 4 depicts a flow diagram of an example of a method by which a computer system creates one or more object files and a first metadata file from source code.

FIG. 4 depicts a flow diagram of an example of a method by which a computer system creates one or more object files and a first metadata file from source code. The method is performed by processing logic that may comprise hardware (circuitry, dedicated logic, etc.), software (such as is run on a general purpose computer system or a dedicated machine), or a combination of both. It should be noted that in some examples blocks depicted in FIG. 4 may be performed simultaneously or in a different order than that depicted.

At block 401, a set S is initialized to the set of source code files, and an empty first metadata file is created. At block 402, a source code file F is selected and removed from set S. At block 403, compilation of file F is initiated.

At block 404, metadata is generated for each scalar type, class type, class template, variable, function type, and function template encountered during compilation of source code file F. A method for generating the metadata is described in detail below with respect to FIG. 5.

At block 405, the metadata generated at block 404 is appended to the first metadata file. At block 406, compilation of source code file F is completed, resulting in one or more object files generated from source code file F. Block 407 checks whether set S is empty; if not, execution continues back at block 402, otherwise execution of the method of FIG. 4 terminates.

Figure 5:
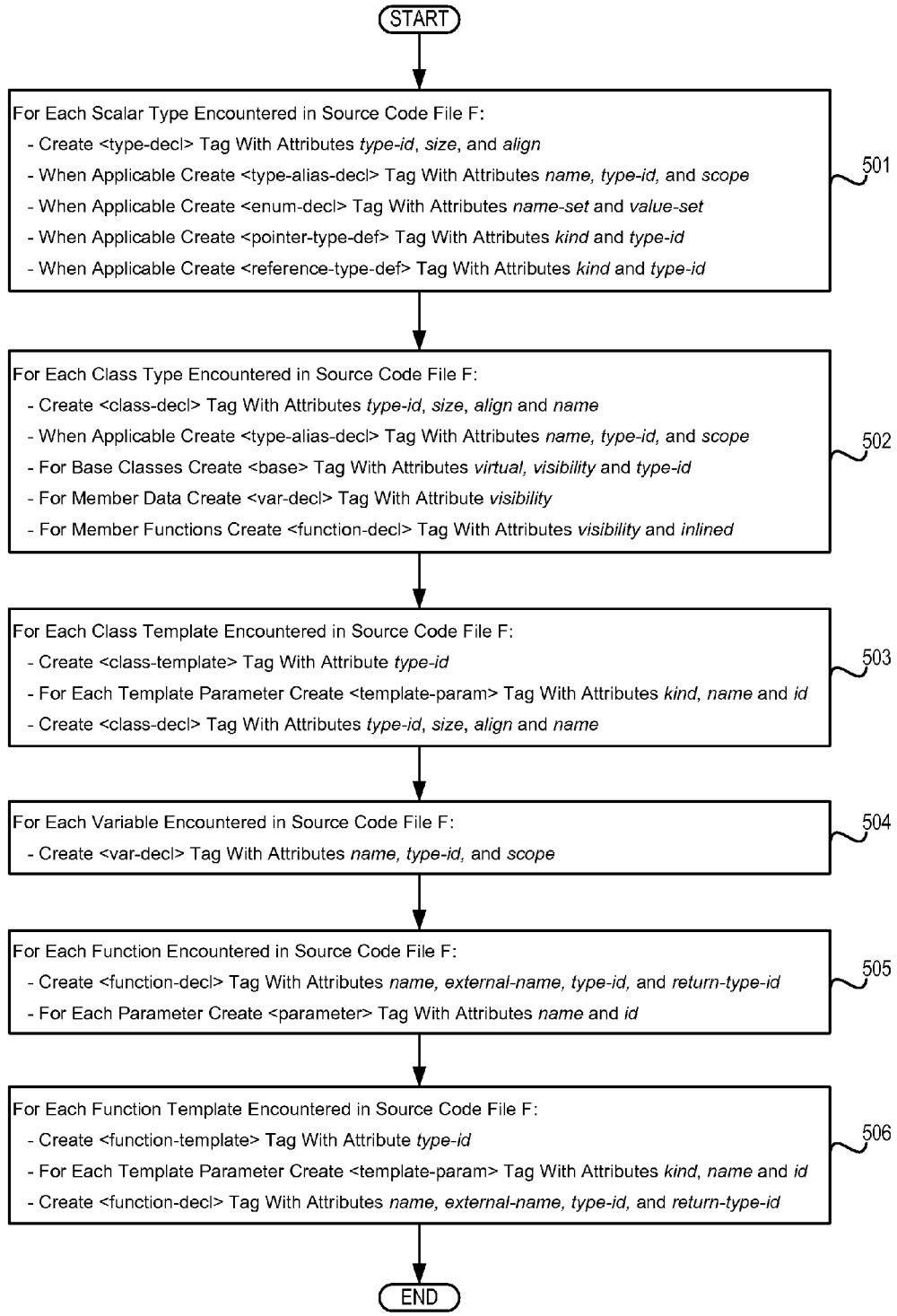
FIG. 5 depicts a flow diagram of an example of a method by which a computer system generates metadata during compilation of source code.

FIG. 5 depicts a flow diagram of an example of a method by which a computer system generates metadata during compilation of source code. The method is performed by processing logic that may comprise hardware (circuitry, dedicated logic, etc.), software (such as is run on a general purpose computer system or a dedicated machine), or a combination of both. It should be noted that in some examples blocks depicted in FIG. 5 may be performed simultaneously or in a different order than that depicted. It should also be noted that attributes described below whose names contain "id" (e.g., id, type-id, etc.) uniquely identify the tag element to which the attribute belongs.

At block 501, the following is performed for each scalar type encountered in source code file F:
  a <type-decl> tag with attributes type-id, size, and align is created;
  a <type-alias-decl> tag with attributes name, type-id, and scope is created when applicable (e.g., when an alias for the scalar type is declared in source code file F);
  an <enum-decl> tag with attributes name-set and value-set is created when applicable (e.g., when the scalar type is an enumerated type);
  a <pointer-type-def> tag with attributes kind and type-id is created when applicable (e.g., when a type for pointers to the scalar type is declared in source code file F); and
  a <reference-type-def> tag with attributes kind and type-id is created when applicable (e.g., when a type for references to the scalar type is declared in source code file F).

At block 502, when applicable (e.g., when file F contains source code in an object-oriented programming language), the following is performed for each class type encountered in file F:
  a <class-decl> tag with attributes type-id, size, align and name is created;
  a <type-alias-decl> tag with attributes name, type-id, and scope is created when applicable (e.g., when an alias for the class type is declared in source code file F);
  when the class type is a base class, a <base> tag with attributes virtual, visibility, and type-id is created;
  a <var-decl> tag with attribute visibility is created for member data of the class type; and
  a <function-decl> tag with attributes visibility and inlined is created for member functions of the class type.

At block 503, when applicable (e.g., when file F contains source code in an object-oriented programming language that employs templates, such as C++), the following is performed for each class template encountered in file F:
  a <class-template> tag with attribute type-id is created;
  a <template-param> tag with attributes kind, name, and id is created for each template parameter; and
  a <class-decl> tag with attributes type-id, size, align and name is created.

At block 504, a <var-decl> tag with attributes name, type-id, and scope is created for each variable encountered in source code file F. At block 505, the following is performed for each function encountered in source code file F:
  a <function-decl> tag with attributes external-name, type-id, and return-type-id is created; and
  a <parameter> tag with attributes name, and id is created for each parameter.

At block 506, when applicable (e.g., when file F contains source code in a language that employs function templates, such as C++), the following is performed for each function template encountered in file F:
  a <function-template> tag with attribute type-id is created;
  a <template-param> tag with attributes kind, name, and id is created for each template parameter; and
  a <function-decl> tag with attributes name, external-name, type-id, and return-type-id is created.

Figure 6:
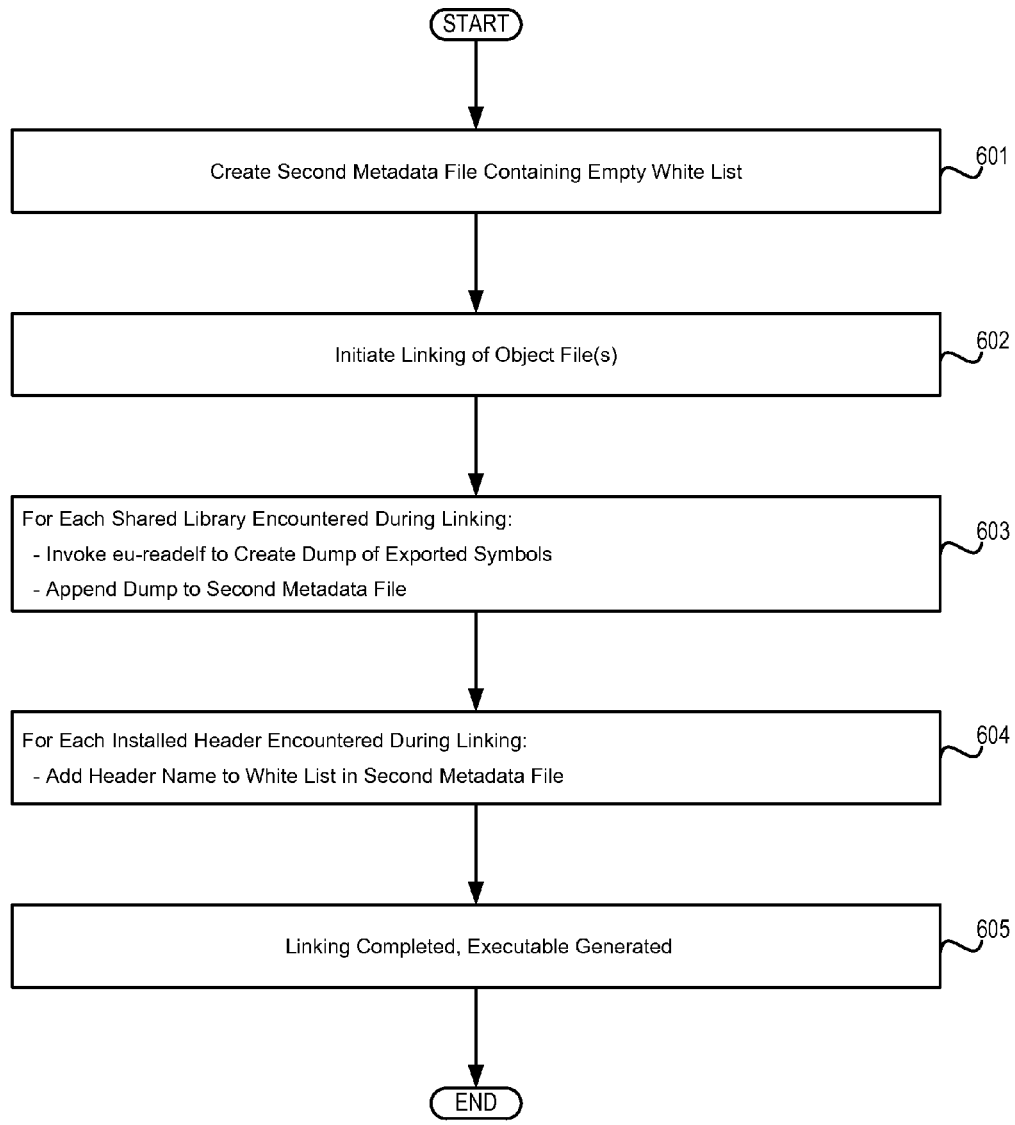
FIG. 6 depicts a flow diagram of an example of a method by which a computer system creates an executable and a second metadata file from one or more object files.

FIG. 6 depicts a flow diagram of an example of a method by which a computer system creates an executable and a second metadata file from one or more object files. The method is performed by processing logic that may comprise hardware (circuitry, dedicated logic, etc.), software (such as is run on a general purpose computer system or a dedicated machine), or a combination of both. It should be noted that in some examples blocks depicted in FIG. 6 may be performed simultaneously or in a different order than that depicted.

At block 601, a second metadata file containing an empty white list is created. At block 602, linking of the one or more object files is initiated. At block 603, the following is performed for each shared library encountered during linking:
  the eu-readelf Linux utility is invoked to create a dump of exported symbols of the shared library; and
  the dump is appended at the end of the second metadata file.

At block 604, one or more header names corresponding to installed header(s) that are encountered during linking are added to the white list in the second metadata file. At block 605, linking is completed and an executable is generated.

Figure 7:
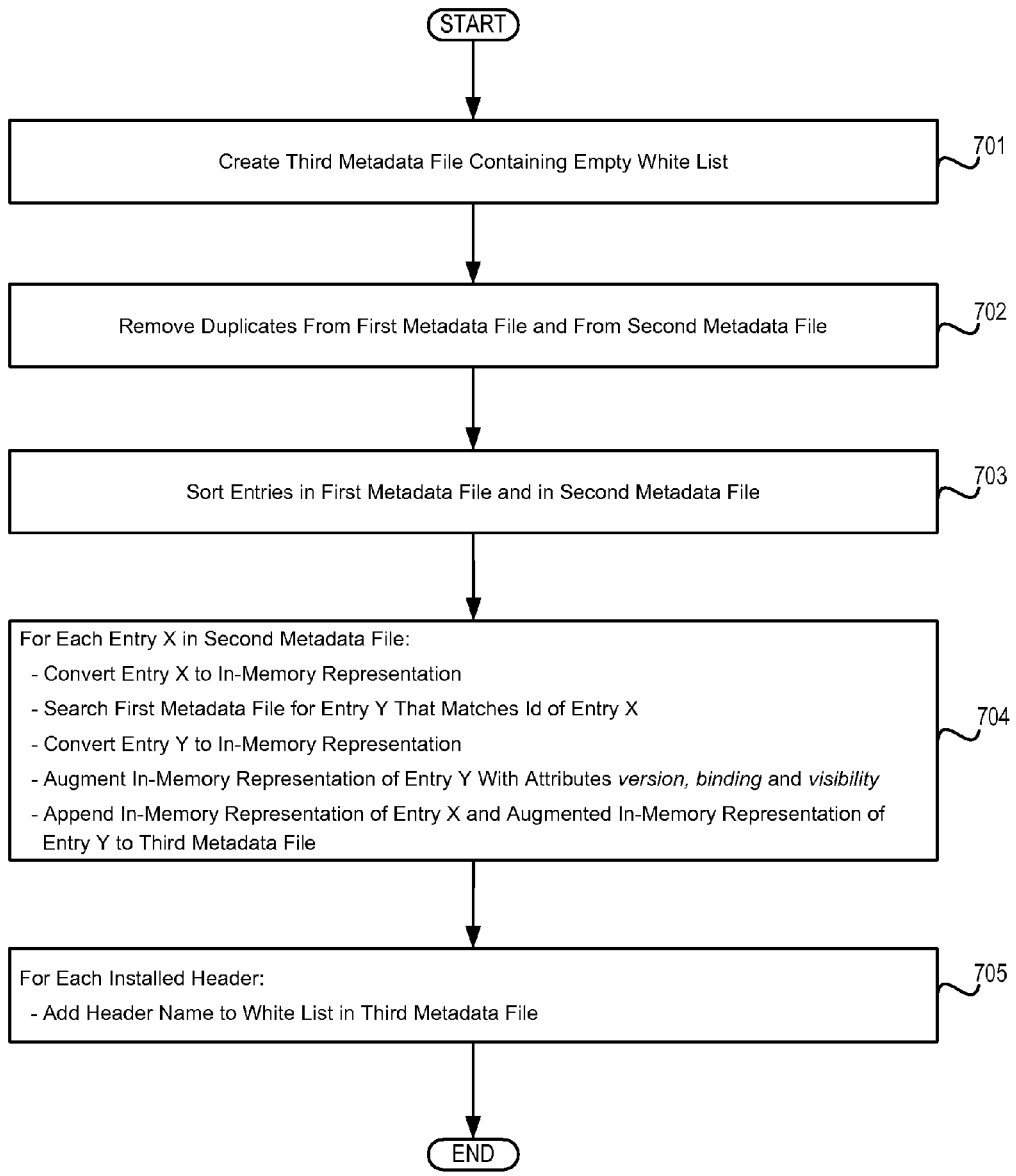
FIG. 7 depicts a flow diagram of an example of a method by which a computer system creates a new metadata file from two existing metadata files.

FIG. 7 depicts a flow diagram of an example of a method by which a computer system creates a new metadata file from two existing metadata files. The method is performed by processing logic that may comprise hardware (circuitry, dedicated logic, etc.), software (such as is run on a general purpose computer system or a dedicated machine), or a combination of both. It should be noted that in some examples blocks depicted in FIG. 7 may be performed simultaneously or in a different order than that depicted.

At block 701, a third metadata file containing an empty white list is created. At block 702, duplicates are removed from the first metadata file and from the second metadata file. At block 703, the entries in the first metadata file are sorted and the entries in the second metadata file are sorted.

At block 704, the following is performed for each entry X in the second metadata file:
  entry X is converted to an in-memory (e.g., de-serialized) representation;
  the first metadata file is searched for an entry Y that matches the identifier of entry X;
  entry Y is converted to an in-memory representation;
  the in-memory representation of entry Y is augmented with additional attributes version, binding, and visibility; and the in-memory representation of entry X and the augmented in-memory representation of entry Y are appended to the end of the third metadata file.

At block 705, one or more header names corresponding to installed header(s) are added to the white list in the third metadata file.

Figure 8:
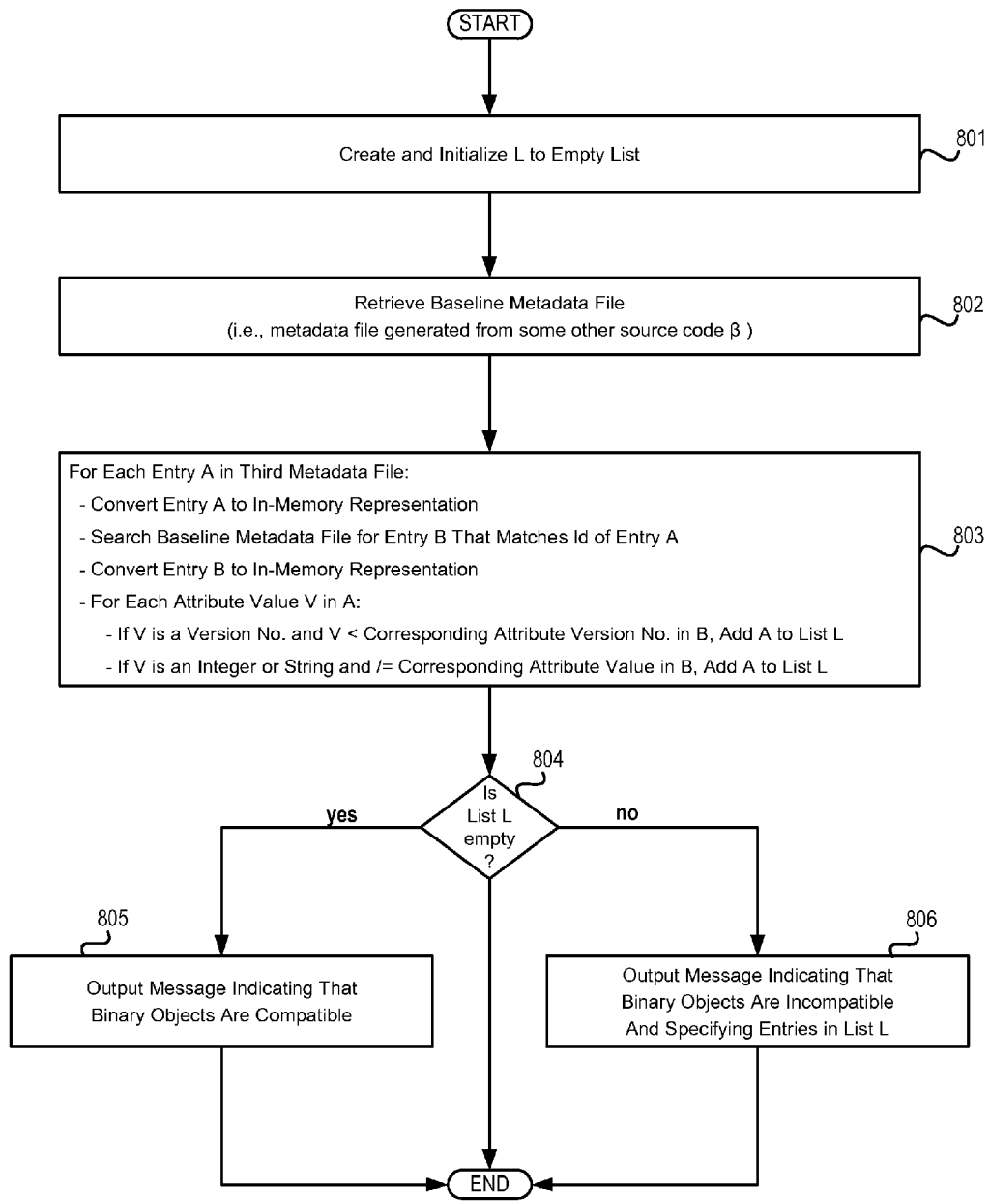
FIG. 8 depicts a flow diagram of an example of a method by which a computer system compares two metadata files to determine compatibility between binary objects.

FIG. 8 depicts a flow diagram of an example of a method by which a computer system compares two metadata files to determine compatibility between binary objects. The method is performed by processing logic that may comprise hardware (circuitry, dedicated logic, etc.), software (such as is run on a general purpose computer system or a dedicated machine), or a combination of both. It should be noted that in some examples blocks depicted in FIG. 8 may be performed simultaneously or in a different order than that depicted.

At block 801, a list L, which corresponds to a "fail list," is created and initialized to an empty list. At block 802, a baseline metadata file corresponding to some other source code β is retrieved. In one example, the baseline metadata file is generated by a previous execution of the method of FIG. 3 for source code β.

At block 803, the following is performed for each entry A in the third metadata file:

entry A is converted to an in-memory (e.g., de-serialized) representation;

the baseline metadata file is searched for an entry B that matches the identifier of entry A;

entry B is converted to an in-memory representation; and for each attribute value of the in-memory representation of entry A:

if the attribute value is a version number, and this version number is less than the version number of the corresponding attribute of the in-memory representation of entry B, then entry A is added to fail list L;

if the attribute value is an integer or a string and does not equal the corresponding attribute value of the in-memory representation of entry B, then entry A is added to fail list L.

Block 804 branches based on whether fail list L is empty; if so, execution proceeds to block 805, otherwise execution continues at block 806. At block 805, a message is output indicating that the binary objects of source code α are compatible with the binary objects of source code β. At block 806, a message is output that indicates that one or more binary objects of source code cc are incompatible with binary objects of source code β, and that specifies the entries in fail list L.

Figure 9:
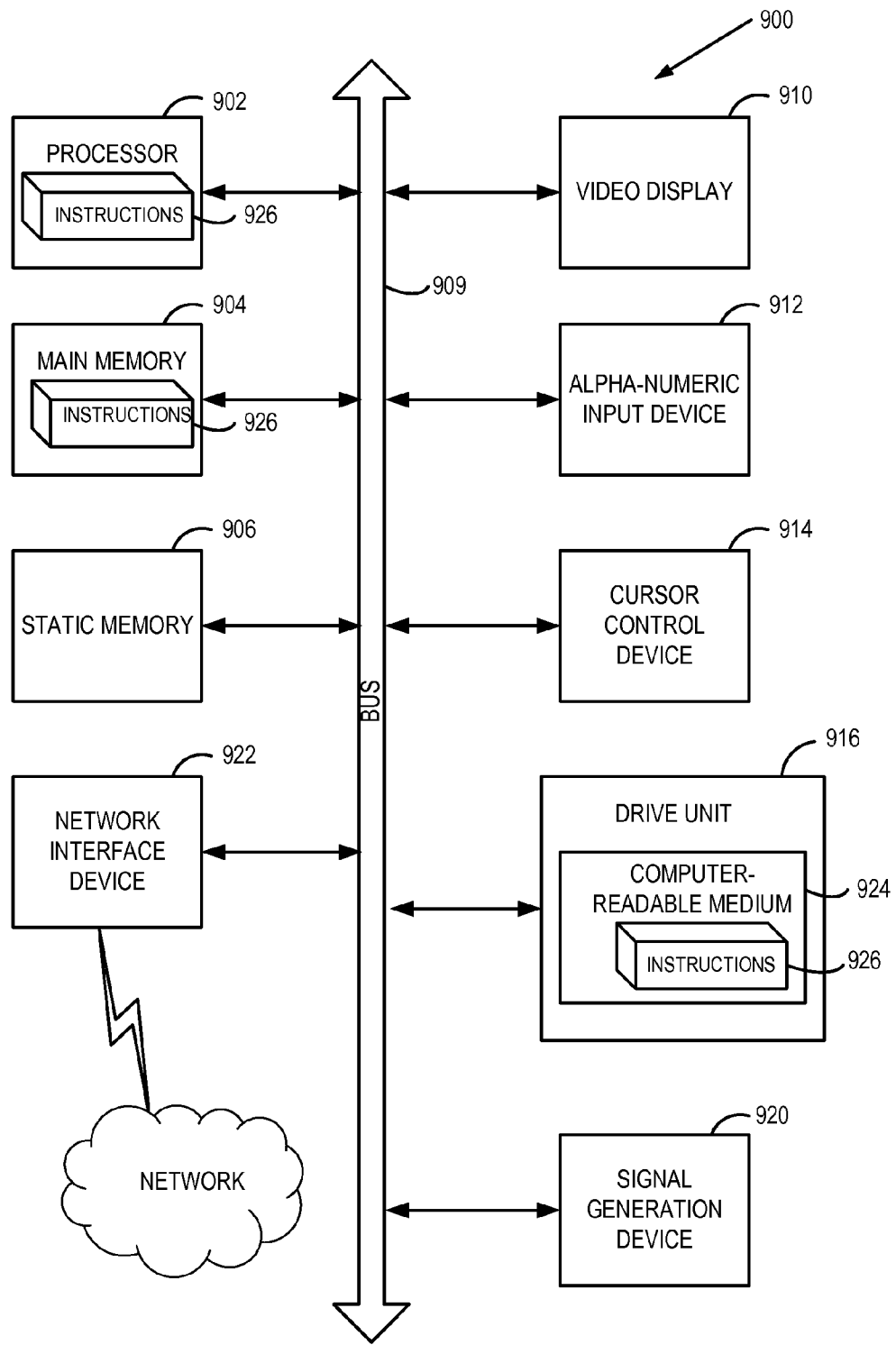
FIG. 9 depicts a block diagram of an illustrative computer system operating in accordance with embodiments of the invention.

FIG. 9 depicts an illustrative computer system within which a set of instructions, for causing the machine to perform any one or more of the methodologies discussed herein, may be executed. In alternative examples, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The illustrative computer system 900 includes a processing system (processor) 902, a main memory 904 (e.g., read-only memory (ROM), flash memory, dynamic random access memory (DRAM) such as synchronous DRAM (SDRAM)), a static memory 906 (e.g., flash memory, static random access memory (SRAM)), and a data storage device 916, which communicate with each other via a bus 908.

Processor 902 represents one or more general-purpose processing devices such as a microprocessor, central processing unit, or the like. More particularly, the processor 902 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 902 may also be one or more special-purpose processing devices such as an application specific integrated circuit (ASIC), a field programmable gate array (FPGA), a digital signal processor (DSP), network processor, or the like. The processor 902 is configured to execute instructions 926 for performing the operations and steps discussed herein.

The computer system 900 may further include a network interface device 922. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), and a signal generation device 920 (e.g., a speaker).

The data storage device 916 may include a computer-readable medium 924 on which is stored one or more sets of instructions 926 (e.g., instructions corresponding to the methods of FIGS. 3 through 8, etc.) embodying any one or more of the methodologies or functions described herein. Instructions 926 may also reside, completely or at least partially, within the main memory 904 and/or within the processor 902 during execution thereof by the computer system 900, the main memory 904 and the processor 902 also constituting computer-readable media. Instructions 926 may further be transmitted or received over a network via the network interface device 922.

While the computer-readable storage medium 924 is shown in an illustrative example to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In another example, instructions or sub-operations of distinct operations may be in an intermittent and/or alternating manner.

In the foregoing description, numerous details have been set forth. It will be apparent, however, to one skilled in the art, that embodiments of the present disclosure may be practiced without these specific details. In some instances, well-known structures and devices are shown in block diagram form, rather than in detail, in order to avoid obscuring the present disclosure.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the foregoing discussion, it is appreciated that throughout the description, discussions utilizing terms such as "receiving", "generating", "compiling", "linking", "including", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the required method steps. In addition, embodiments of the present disclosure are not described with reference to any particular programming language. It will be appreciated that a variety of programming languages may be used to implement the teachings of the disclosure as described herein.

Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus. Embodiments of the present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
    receiving, by a processor of a computer system, a command to compile source code into an object file and a first executable;
    generating by the processor, in response to the command, the first executable and a metadata file for the first executable, the metadata file for the first executable comprising information identifying a variable and a function of the source code, wherein the generating is in view of a first metadata file of the source code and a second metadata file of the object file, and wherein the generating further comprises converting an entry of the first metadata file and an entry of the second metadata file associated with the entry of the first metadata file to in-memory representations;
    comparing, by the processor of the computer system, the metadata file for the first executable with a metadata file for a second executable prior to the first executable being deployed to another computer system; and
    determining whether the first executable and the second executable are compatible in view of the comparing.

2. The method of claim 1 wherein the source code is in an object-oriented programming language, and wherein the metadata files for the first executable and the second executable further comprise information pertaining to at least one of a class type of the source code, a class template of the source code, or a function template of the source code.

3. The method of claim 1 wherein the generating of the first executable and the metadata file for the first executable comprises:
    compiling, by the processor, the source code into the object file;
    generating the first metadata file in view of the source code; and
    generating the second metadata file in view of the object file.

4. The method of claim 3 wherein the generating of the first executable comprises linking the object file and a shared library, and wherein the generating of the second metadata file comprises:
    creating a dump of an exported symbol of the shared library; and
    including the dump in the second metadata file.

5. The method of claim 1 wherein the generating of the metadata file for the first executable further comprises:
    augmenting the in-memory representation of the entry of the first metadata file to comprise additional attributes; and
    including the in-memory representation of the entry of the second metadata file and the augmented in-memory representation of the entry of the first metadata file in the metadata file for the first executable.

6. The method of claim 3 further comprising determining whether the source code is compatible with other source code via a comparison of the first metadata file with another metadata file that is in view of the other source code.

7. A computer system comprising:
a memory to store source code; and
a processor operatively coupled to the memory, the processor to:
receive a command to compile the source code into an object file and a first executable;
generate, in response to the command, the first executable and a metadata file for the first executable, the metadata file for the first executable comprising information identifying a variable and a function of the source code, wherein to generate comprises the processor to generate the metadata file for the first executable in view of a first metadata file of the source code and in view of a second metadata file of the object file, and to further convert an entry of the first metadata file and an entry of the second metadata file associated with the entry of the first metadata file to in-memory representations;
compare, by the processor of the computer system, the metadata file for the first executable with a metadata file for a second executable prior to the first executable being deployed to another computer system; and
determine whether the first executable and the second executable are compatible in view of the comparison.

8. The computer system of claim 7 wherein the source code is in an object-oriented programming language, and wherein the metadata files of the first executable and the second executable further comprise information pertaining to at least one of a class type of the source code, a class template of the source code, or a function template of the source code.

9. The computer system of claim 7 wherein to generate the first executable and the metadata file for the first executable comprises the processor to:
compile the source code into the object file;
generate the first metadata file in view of the source code; and
generate the second metadata file in view of the object file.

10. The computer system of claim 9 wherein to generate the first executable comprises a linking process, and wherein to generate the second metadata file comprises the processor to include in the second metadata file a header name of an installed header encountered during the linking process.

11. The computer system of claim 7 wherein to generate the metadata file for the first executable further comprises the processor to:
augment the in-memory representation of the entry of the first metadata file to comprise additional attributes; and
include the in-memory representation of the entry of the second metadata file and the augmented in-memory representation of the entry of the first metadata file in the metadata file for the first executable.

12. The computer system of claim 9, wherein the processing device is to determine the source code is compatible with other source code via a comparison of the first metadata file with another metadata file that is in view of the other source code.

13. A non-transitory computer readable storage medium comprising instructions stored therein, which when executed, cause a processor of a computer system to:
receive a command to compile source code into an object file and a first executable;
generate by the processor, in response to the command, the first executable and a metadata file for the first executable, the metadata file for the first executable comprising information identifying a variable and a function of the source code, wherein to generate comprises the processor to generate the metadata file for the first executable in view of a first metadata file of the source code and in view of a second metadata file of the object file, and to further convert an entry of the first metadata file and an entry of the second metadata file associated with the entry of the first metadata file to in-memory representations;
compare, by the processor of the computer system, the metadata file for the first executable with a metadata file for a second executable prior to the first executable being deployed to another computer system; and
determine whether the first executable and the second executable are compatible in view of the comparison.

14. The non-transitory computer readable storage medium of claim 13 wherein the source code is in an object-oriented programming language, and wherein the metadata files of the first executable and the second executable further comprise information pertaining to at least one of a class type of the source code, a class template of the source code, or a function template of the source code.

15. The non-transitory computer readable storage medium of claim 13 wherein to generate the first executable and the metadata file for the first executable comprises the processor to:
compile the source code into the object file;
generate the first metadata file in view of the source code; and
generate the second metadata file in view of the object file.

16. The non-transitory computer readable storage medium of claim 15 wherein to generate the first executable comprises the processor to link the object file and a shared library, and wherein to generate the second metadata file comprises the processor to:
create a dump of an exported symbol of the shared library; and
include the dump in the second metadata file.

17. The non-transitory computer readable storage medium of claim 15 wherein the processor further to determine whether the source code is compatible with other source code via a comparison of the first metadata file with another metadata file that is in view of the other source code.

* * * * *